United States Patent
Minami et al.

(10) Patent No.: US 9,389,123 B2
(45) Date of Patent: Jul. 12, 2016

(54) MASK APPLIED TO A SENSING SURFACE OF A DUAL PYROELECTRIC SENSOR

(71) Applicant: EIZO Corporation, Ishikawa (JP)

(72) Inventors: Sachi Minami, Ishikawa (JP); Shuhei Miyanaga, Ishikawa (JP); Takashi Murata, Ishikawa (JP); Seiji Miyazawa, Ishikawa (JP)

(73) Assignee: EIZO Corporation, Ishikawa (JP)

( * ) Notice: Subject to any disclaimer, the term of this patent is extended or adjusted under 35 U.S.C. 154(b) by 0 days.

(21) Appl. No.: 14/418,837

(22) PCT Filed: Feb. 28, 2013

(86) PCT No.: PCT/JP2013/055323
§ 371 (c)(1),
(2) Date: Jan. 30, 2015

(87) PCT Pub. No.: WO2014/020927
PCT Pub. Date: Feb. 6, 2014

(65) Prior Publication Data
US 2015/0153235 A1    Jun. 4, 2015

(30) Foreign Application Priority Data

Jul. 31, 2012  (JP) .................. 2012-170457

(51) Int. Cl.
*G01J 5/12* (2006.01)
*G01J 5/08* (2006.01)
*G01J 1/04* (2006.01)
(Continued)

(52) U.S. Cl.
CPC ............. *G01J 5/0831* (2013.01); *G01J 1/0437* (2013.01); *G01J 5/0025* (2013.01); *G01J 5/34* (2013.01); *G02B 5/208* (2013.01)

(58) Field of Classification Search
None
See application file for complete search history.

(56) References Cited

U.S. PATENT DOCUMENTS

| 6,403,959 B1 | 6/2002 | Fujikawa et al. |
| 8,502,149 B2 * | 8/2013 | Tsuchiya .................. 250/338.3 |
| 2015/0053859 A1 * | 2/2015 | Saito ......................... 250/338.3 |

FOREIGN PATENT DOCUMENTS

| JP | 59-012075 | 1/1984 |
| JP | 02-278131 A | 11/1990 |

(Continued)

OTHER PUBLICATIONS

International Search Report dated Jun. 11, 2013 from corresponding International Patent Application No. PCT/JP2013/055323; 2 pgs.

(Continued)

*Primary Examiner* — Derek S Chapel
(74) *Attorney, Agent, or Firm* — Maier & Maier, PLLC

(57) ABSTRACT

A mask used in a dual pyroelectric sensor and configured to allow the pyroelectric sensor to accurately detect a movement of a moving object in each of the disposition direction of two pyroelectric elements and a direction perpendicular to the disposition direction. The mask is applied to the sensing surface of the dual pyroelectric sensor to increase the sensitivity with which the pyroelectric sensor detects a moving object. The mask includes a sheet configured to block infrared rays and an aperture pattern including through holes formed in the sheet. The aperture pattern is formed in such a manner that the percentages of the respective infrared-irradiated ranges of the two pyroelectric elements of the pyroelectric sensor vary with a movement of a moving object in each of x- and y-directions.

6 Claims, 12 Drawing Sheets

(51) Int. Cl.
*G01J 5/34* (2006.01)
*G01J 5/00* (2006.01)
*G02B 5/20* (2006.01)

(56) References Cited

FOREIGN PATENT DOCUMENTS

| JP | 04-160324 | 6/1992 |
|---|---|---|
| JP | 04-346037 A | 12/1992 |
| JP | 05-164608 | 6/1993 |
| JP | 05-203500 A | 8/1993 |
| JP | 7-41430 | 7/1995 |
| JP | 09-015040 A | 1/1997 |
| JP | 10-162256 | 6/1998 |
| JP | 2002-310789 A | 10/2002 |
| JP | 2013-044586 A | 3/2013 |
| WO | 99/41575 A1 | 8/1999 |

OTHER PUBLICATIONS

Notice of Reason for Refusal dated May 27, 2013 from corresponding Japanese Application No. JP 2012-170457; 8 pgs.
Final Notice of Reason for Refusal dated Nov. 7, 2013 from corresponding Japanese Application No. JP 2012-170457; 6 pgs.
Extended European Search Report dated Jun. 17, 2015, in connection with corresponding EP Application No. 13826084.9 (7 pgs.).

* cited by examiner

93

93

FIG. 7
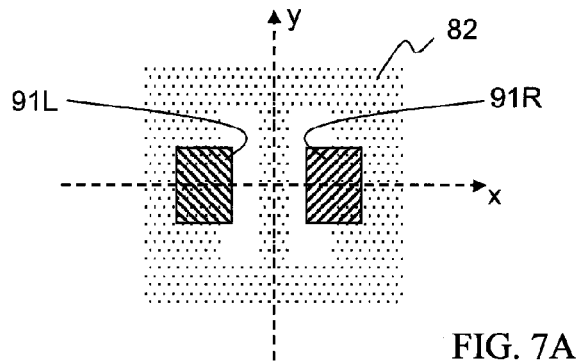
FIG. 7A
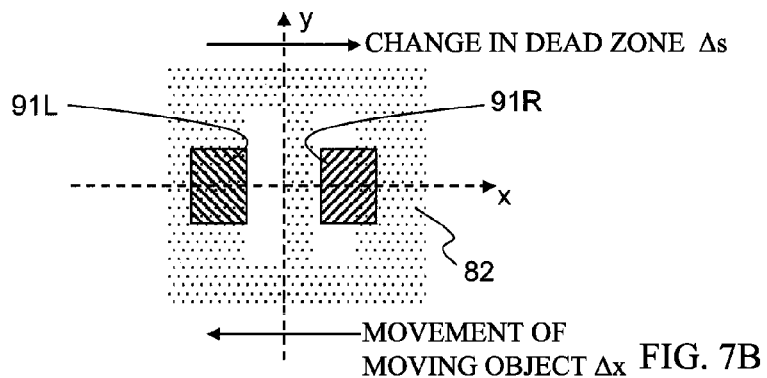
FIG. 7B
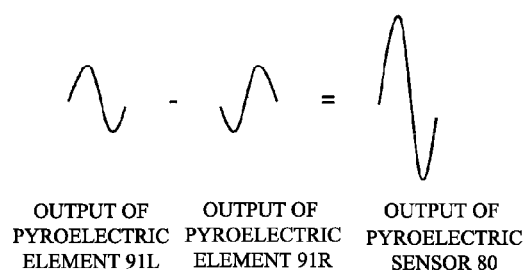
OUTPUT OF　　OUTPUT OF　　OUTPUT OF
PYROELECTRIC　PYROELECTRIC　PYROELECTRIC
ELEMENT 91L　ELEMENT 91R　SENSOR 80
FIG. 7C
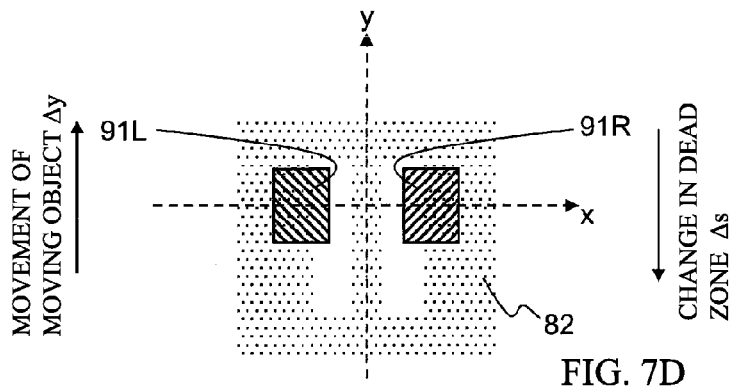
FIG. 7D FIG. 8
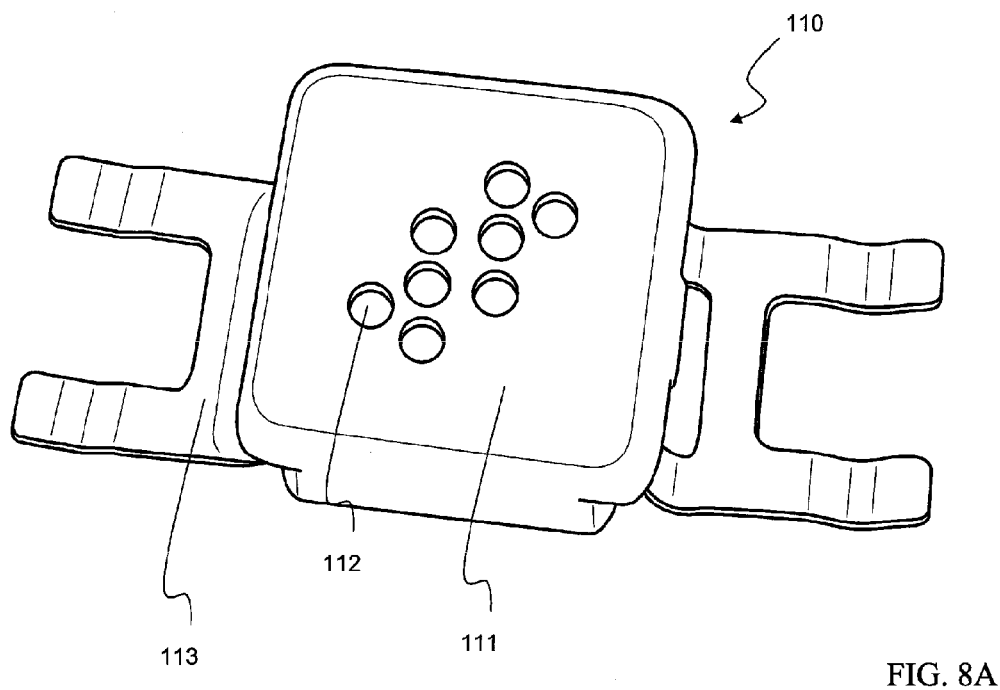
FIG. 8A
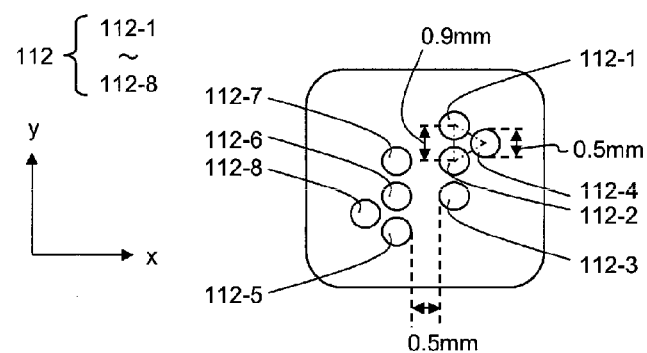
FIG. 8B FIG. 9
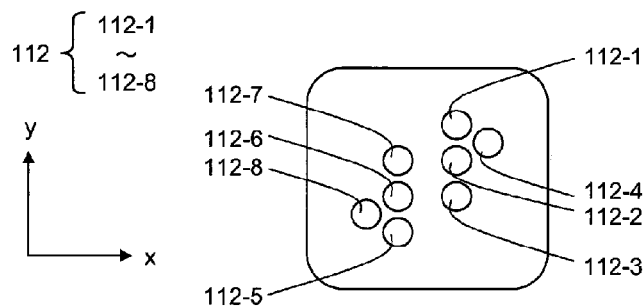
FIG. 10
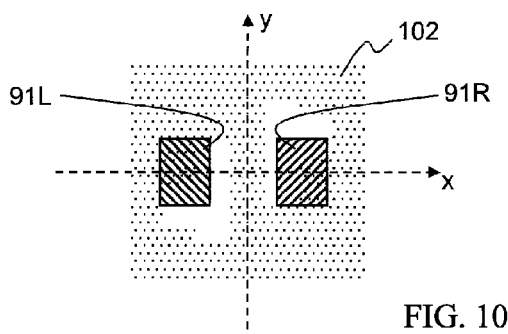
FIG. 10A
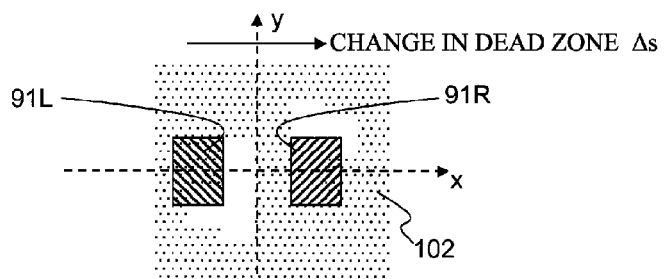
FIG. 10B
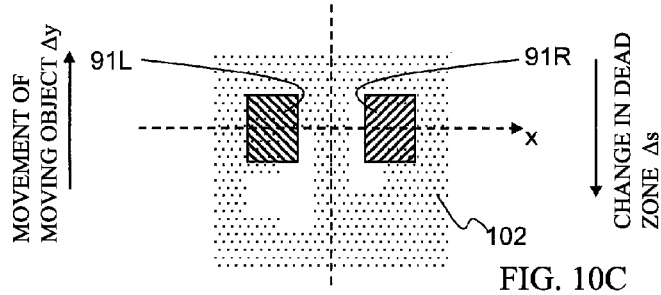
FIG. 10C

FIG. 11

| | | CONVEN-TIONAL ART | APERTURE PATTERN 112A | APERTURE PATTERN 112B | APERTURE PATTERN 112C | APERTURE PATTERN 112D | APERTURE PATTERN 112 |
|---|---|---|---|---|---|---|---|
| X-DIRECTION DETECTION | IRRADIATED RANGE OF PYROELECTRIC ELEMENT 91L $\Delta(-)$ | -30% | -15% | -30% | -15% | -30% | -30% |
| | IRRADIATED RANGE OF PYROELECTRIC ELEMENT 91R $\Delta(+)$ | 30% | 15% | 30% | 15% | 30% | 22.5% |
| | $\lvert \Delta(-) - \Delta(+) \rvert$ | 60% | 30% | 60% | 30% | 60% | 52.5% |
| Y-DIRECTION DETECTION | IRRADIATED RANGE OF PYROELECTRIC ELEMENT 91L $\Delta(-)$ | 0% | -15% | -15% | -45% | -15% | -30% |
| | IRRADIATED RANGE OF PYROELECTRIC ELEMENT 91R $\Delta(+)$ | 0% | 15% | 0% | 30% | 30% | 30% |
| | $\lvert \Delta(-) - \Delta(+) \rvert$ | 0% | 30% | 15% | 75% | 45% | 60% |

FIG. 12
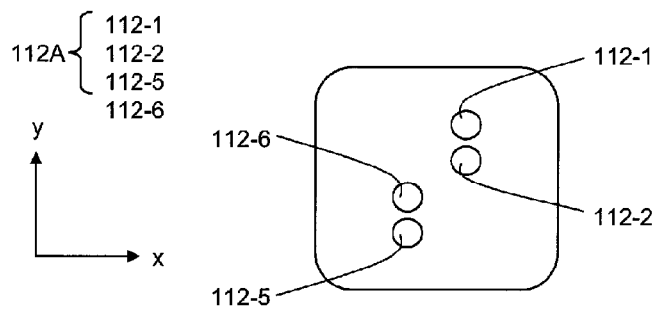
FIG. 13
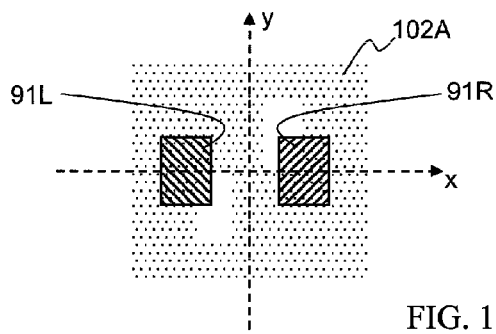
FIG. 13A
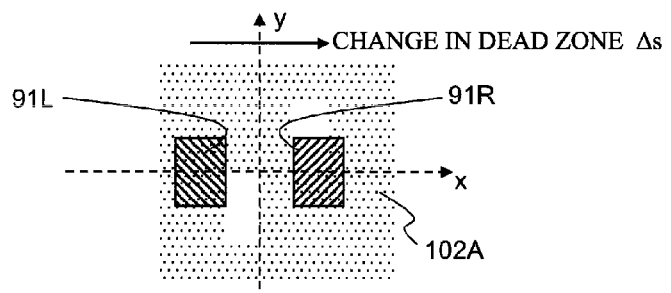
FIG. 13B
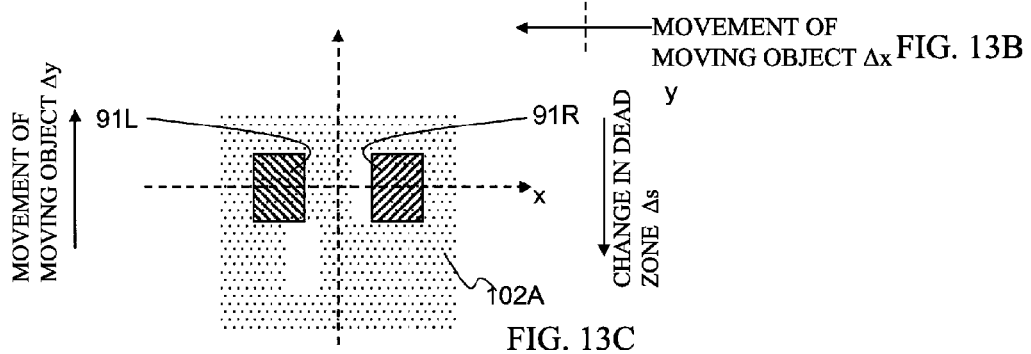
FIG. 13C FIG. 14
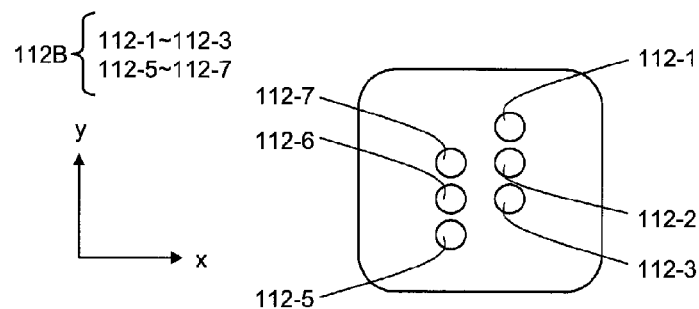
FIG. 15
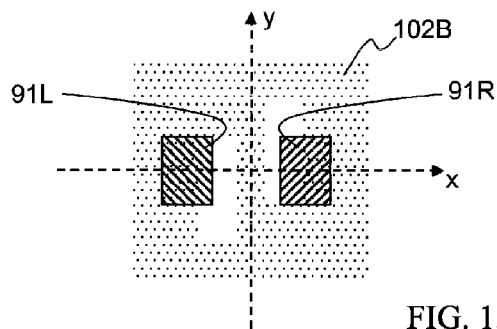
FIG. 15A
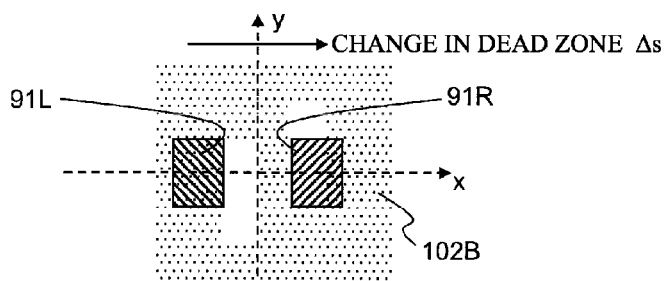
FIG. 15B
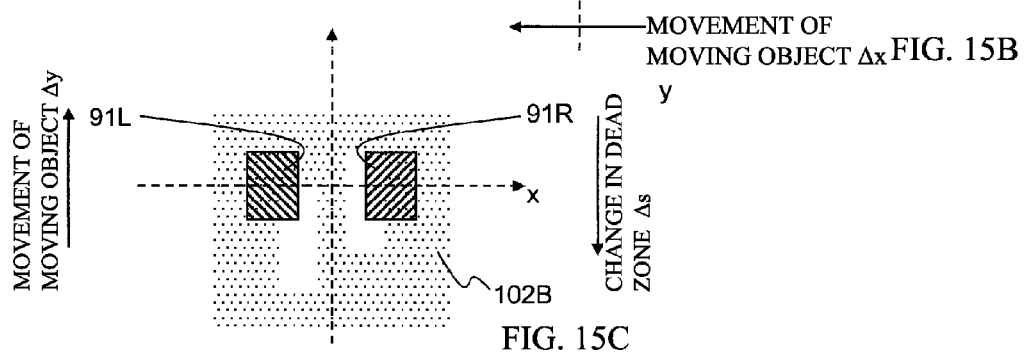
FIG. 15C FIG. 16
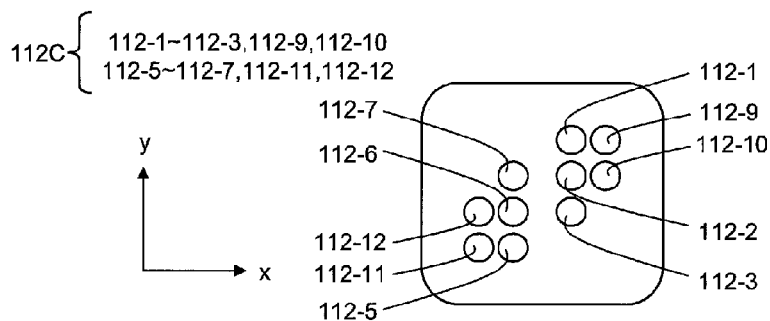
FIG. 17
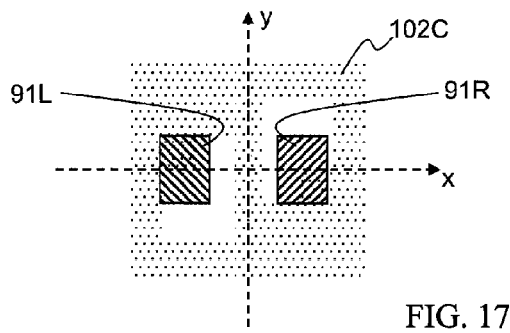
FIG. 17A
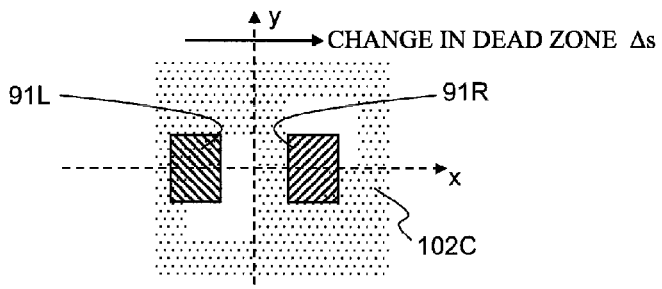
FIG. 17B
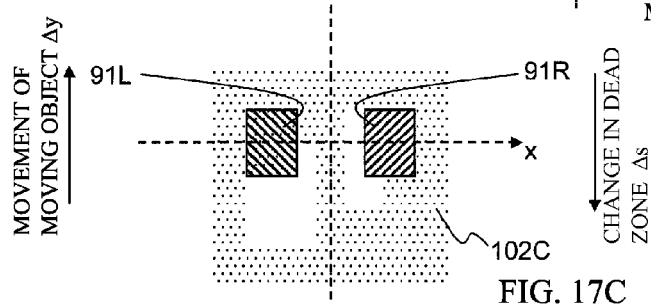
FIG. 17C FIG. 18
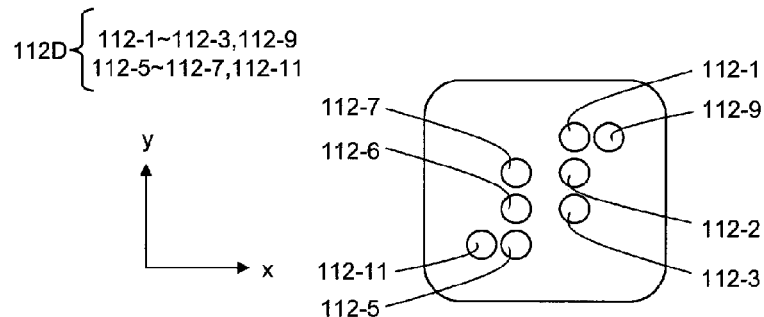
FIG. 19
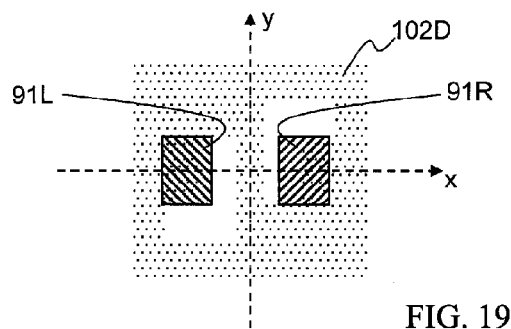
FIG. 19A
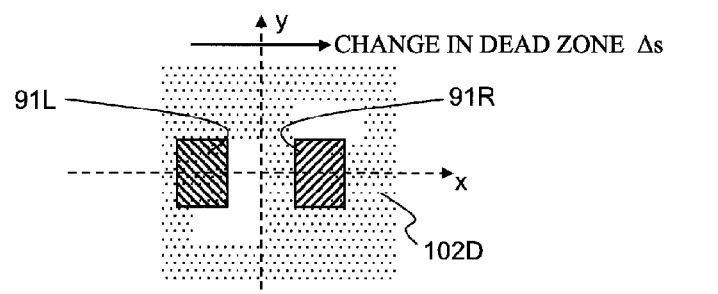
FIG. 19B
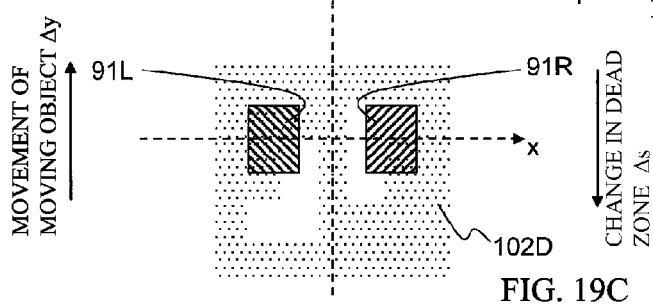
FIG. 19C FIG. 20
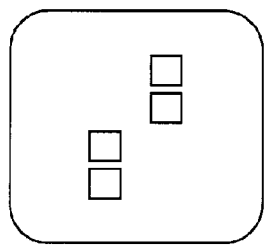
FIG. 20A
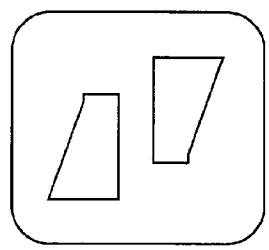
FIG. 20D
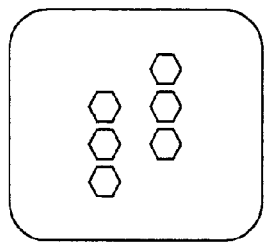
FIG. 20B
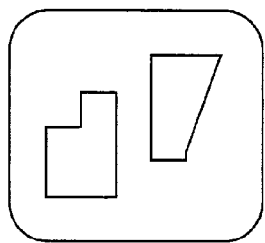
FIG. 20E
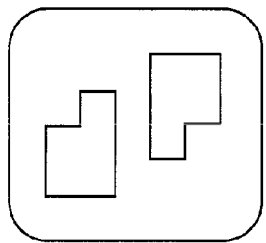
FIG. 20C
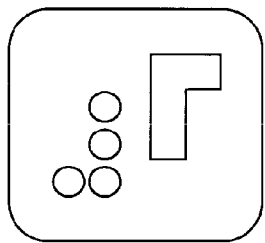
FIG. 20F
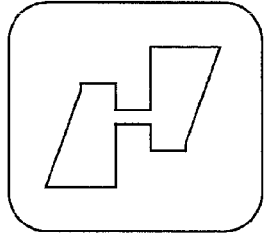
FIG. 20G

MASK APPLIED TO A SENSING SURFACE OF A DUAL PYROELECTRIC SENSOR

TECHNICAL FIELD

The present invention relates to a mask applied to a pyroelectric sensor. In particular, the invention relates to a mask applied to the sensing surface of a dual pyroelectric sensor to increase the sensitivity with which the pyroelectric sensor detects a moving object.

BACKGROUND ART

Known conventional technologies of applying a mask to a pyroelectric sensor include Patent Literature 1. Patent Literature 1 sets or adjusts the sensing area of a pyroelectric sensor by applying a mask to the lens of the pyroelectric sensor.

A pyroelectric sensor uses the pyroelectric effect of an element called a pyroelectric material (hereafter referred to as a "pyroelectric element"), such as a ferroelectric ceramic. A pyroelectric effect refers to a phenomenon in which thermal energy based on a small amount of infrared rays emitted by an animal, human body, or the like (hereafter simply referred to as a "human body or the like") causes a temperature change, which then induces electrical charge on the surface of the pyroelectric material, thereby generating an electromotive force. A human body or the like emitting infrared rays is hereafter referred to as a moving object.

The operation principle of a pyroelectric element 91 will be described with reference to FIGS. 1 and 2. As shown in FIG. 1, the pyroelectric element 91, which has been subjected to polarization treatment, is stably polarized at a given temperature T [° C.]. In this state, positive float charge and negative float charge are adsorbed on the negatively polarized surface and positively polarized surface, respectively, due to the nature of static electricity, and there is no potential difference between the upper and lower surfaces of the pyroelectric element 91.

A blackened film (not shown) is disposed on the infrared entry side of the pyroelectric element 91. When infrared rays enter the blackened film, the blackened film converts the infrared energy into thermal energy, thereby changing the temperature of the pyroelectric element 91 by $\Delta T$ [° C.]. Since the polarization of the pyroelectric element 91 depends on the temperature, the magnitude of the polarization in the pyroelectric element 91 varies with the temperature change, as shown in FIG. 2. At this time, the surface charge based on the floating charge cannot respond to the temperature change as quickly as to the polarization change. Accordingly, an amount of charge corresponding to the polarization change temporarily remains on the element surface. This charge generates an electromotive force, which in turn causes a current flow.

Next, a dual pyroelectric sensor 90 will be described. FIG. 3 shows a circuit diagram of the dual pyroelectric sensor 90. The dual pyroelectric sensor 90 has two pyroelectric elements, 91R and 91L, having different polarities disposed on the sensing surface thereof. The pyroelectric elements 91R and 91L are connected in series in reverse polarity. The pyroelectric sensor 90 outputs the difference between the outputs of the pyroelectric elements 91R and 91L. The dual pyroelectric sensor 90 thus configured has the following characteristics. (1) When a moving object moves in a direction which crosses the pyroelectric elements 91R and 91L (disposition direction), the voltage sequentially changes in the positive and negative directions, like that of an alternating current. Accordingly, a high output voltage can be obtained from the sensor circuit. (2) When external light such as sunlight simultaneously enters the pyroelectric elements 91R and 91L, the outputs thereof cancel out each other since the pyroelectric elements are connected in reverse polarity. Accordingly, the dual pyroelectric sensor 90 produces no output. As a result, a malfunction of the dual pyroelectric sensor 90 can be prevented. (3) Additionally, the dual pyroelectric sensor 90 is resistant to changes in the ambient environment such as vibration or temperature.

The dual pyroelectric sensor 90 having such characteristics is typically used in combination with a light-harvesting Fresnel lens. On the other hand, in order to detect a moving object at a relatively short distance, there have been commercialized pyroelectric sensors which are combined with a mask having an aperture pattern, such as a punching metal, in place of a Fresnel lens and thus are miniaturized.

FIG. 4 is an external view of a mask 93 attached to a lower portion of a liquid crystal display. FIG. 5 is a schematic diagram of the aperture pattern of the mask 93. FIG. 6 shows changes in a dead zone 82 (the shadow of the mask) when a moving object 81 crosses a pyroelectric sensor 80. FIG. 7A shows the positional relationship between the dead zone 82 and the pyroelectric elements 91R and 91L when the moving object 81 is located in front of the pyroelectric sensor 80. FIG. 7B shows the positional relationship between the dead zone 82 and the pyroelectric elements 91R and 91L when the moving object 81 moves in an x-direction (left direction) with respect to the pyroelectric sensor 80. FIG. 7C shows images of outputs when the dead zone 82 changes from that in FIG. 7A to that in FIG. 7B. Note that in FIGS. 6, 7A, and 7B, the aperture pattern and irradiated portion are shown not as a circular portion but as a region including the aperture pattern and irradiated portion for simplification.

It is known that when the dead zone 82, to which no infrared rays are applied, is arbitrarily generated on the pyroelectric elements 91R and 91L using a mask as described above, the pyroelectric sensor 80 can increase the sensitivity with which it detects a movement of the moving object 81. Assuming that the total area of each of the pyroelectric elements 91R and 91L is 90% for convenience, in FIG. 7B, the irradiated range of the pyroelectric element 91R increases by 30%; the irradiated range of the pyroelectric element 91L decreases by 30%. Accordingly, there is a difference of 60% therebetween. Use of this difference allows for increase of the detection sensitivity.

PRIOR ART LITERATURE

Patent Literature

Patent Literature 1: Japanese Unexamined Patent Application Publication No. 10-162256

SUMMARY OF THE INVENTION

Problems to be Solved by the Invention

However, when the moving object moves in a y-direction, the pyroelectric sensor 80 of the conventional art cannot detect the movement of the moving object, as shown in FIG. 7D. This is because the amount of infrared rays applied to the pyroelectric elements 91R and 91L does not change. That is, while the pyroelectric sensor 80 can detect the movement of the moving object in the disposition direction of the pyroelectric elements 91R and 91L (x-direction), it cannot detect the movement of the moving object in a direction perpendicular to the disposition direction (y-direction).

A liquid crystal display, for example, may be used in landscape orientation (with the long sides being horizontal and the short sides being vertical) or may be used in portrait orientation (with the short sides being horizontal and the long sides being vertical). To accurately detect a movement of the user regardless of in which orientation the liquid crystal display is used, it is necessary to mount two pyroelectric sensors (one for landscape orientation and one for portrait orientation) or mount a mechanism or the like for mechanically rotating the pyroelectric sensor by 90°.

An object of the present invention is to provide a mask which is used in a dual pyroelectric sensor and which allows the pyroelectric sensor to accurately detect a movement of a moving object in each of the disposition direction of two pyroelectric elements and a direction perpendicular to the disposition direction.

Means for Solving the Problems

To solve the above problem, a first aspect of the present invention provides a mask applied to a sensing surface of a dual pyroelectric sensor to increase sensitivity with which the pyroelectric sensor detects a moving object. The mask includes a sheet configured to block infrared rays and an aperture pattern including through holes formed in the sheet. The aperture pattern is formed in such a manner that percentages of respective infrared-irradiated ranges of two pyroelectric elements of the pyroelectric sensor vary with a movement of a moving object in each of x- and y-directions. The x-direction is a disposition direction of the two pyroelectric elements on the sensing surface, and the y-direction is a direction perpendicular to the x-direction on the sensing surface.

Effect of the Invention

Use of the mask of the present invention produces an effect of allowing a dual pyroelectric sensor to accurately detect a movement of a moving object in each of the disposition direction of two pyroelectric elements and a direction perpendicular to the disposition direction.

BRIEF DESCRIPTION OF THE DRAWINGS

FIG. 7A is a diagram showing the positional relationship between a dead zone and two pyroelectric elements when a moving object is located in front of a pyroelectric sensor.

FIG. 7B is a diagram showing the positional relationship between the dead zone and the two pyroelectric elements when the moving object moves in an x-direction (left direction) with respect to the pyroelectric sensor.

FIG. 7C is a diagram showing images of outputs when the dead zone changes from that in FIG. 7A to that in FIG. 7B.

FIG. 7D is a diagram showing the positional relationship between the dead zone and the two pyroelectric elements when the moving object moves in a y-direction (upward direction) with respect to the pyroelectric sensor.

FIG. 8A is an external view of a mask of a first embodiment.

FIG. 8B is a diagram showing example sizes of the aperture pattern of the mask.

FIG. 9 is a schematic diagram of the aperture pattern of the mask of the first embodiment.

FIG. 10A is a diagram showing the positional relationship between the dead zone of the aperture pattern of the mask of the first embodiment and two pyroelectric elements when a moving object is located in front of a pyroelectric sensor.

FIG. 10B is a diagram showing the positional relationship between the dead zone of the aperture pattern of the mask of the first embodiment and the two pyroelectric elements when the moving object moves in the x-direction (left direction) with respect to the pyroelectric sensor.

FIG. 10C is a diagram showing the positional relationship between the dead zone of the aperture pattern of the mask of the first embodiment and the two pyroelectric elements when the moving object moves in the y-direction (upward direction) with respect to the pyroelectric sensor.

FIG. 11 is a diagram showing variations in the irradiated ranges associated with movements of a moving object when each aperture pattern is used.

FIG. 12 is a schematic diagram of an aperture pattern 112A.

FIG. 13A is a diagram showing the positional relationship between the dead zone of the aperture pattern 112A and two pyroelectric elements when a moving object is located in front of a pyroelectric sensor.

FIG. 13B is a diagram showing the positional relationship between the dead zone of the aperture pattern 112A and the two pyroelectric elements when the moving object moves in the x-direction (left direction) with respect to the pyroelectric sensor.

FIG. 13C is a diagram showing the positional relationship between the dead zone of the aperture pattern 112A and the two pyroelectric elements when the moving object moves in the y-direction (upward direction) with respect to the pyroelectric sensor.

FIG. 14 shows a schematic diagram of an aperture pattern 112B.

FIG. 15A is a diagram showing the positional relationship between the dead zone of the aperture pattern 112B and two pyroelectric elements when a moving object is located in front of a pyroelectric sensor.

FIG. 15B is a diagram showing the positional relationship between the dead zone of the aperture pattern 112B and the two pyroelectric elements when the moving object moves in the x-direction (left direction) with respect to the pyroelectric sensor.

FIG. 15C is a diagram showing the positional relationship between the dead zone of the aperture pattern 112B and the two pyroelectric elements when the moving object moves in the y-direction (upward direction) with respect to the pyroelectric sensor.

FIG. 16 is a schematic diagram of an aperture pattern 112C.

FIG. 17A is a diagram showing the positional relationship between the dead zone of the aperture pattern 112C and two pyroelectric elements when a moving object is located in front of a pyroelectric sensor.

FIG. 17B is a diagram showing the positional relationship between the dead zone of the aperture pattern 112C and the two pyroelectric elements when the moving object moves in the x-direction (left direction) with respect to the pyroelectric sensor.

FIG. 17C is a diagram showing the positional relationship between the dead zone of the aperture pattern 112C and the two pyroelectric elements when the moving object moves in the y-direction (upward direction) with respect to the pyroelectric sensor.

FIG. 18 is a schematic diagram of an aperture pattern 112D.

FIG. 19A is a diagram showing the positional relationship between the dead zone of the aperture pattern 112D and two pyroelectric elements when a moving object is located in front of a pyroelectric sensor.

FIG. 19B is a diagram showing the positional relationship between the dead zone of the aperture pattern 112D and the two pyroelectric elements when the moving object moves in the x-direction (left direction) with respect to the pyroelectric sensor.

FIG. 19C is a diagram showing the positional relationship between the dead zone of the aperture pattern 112D and the two pyroelectric elements when the moving object moves in the y-direction (upward direction) with respect to the pyroelectric sensor.

FIGS. 20A and 20B are diagrams each showing a modification in which multiple through holes forming an aperture pattern are not circular.

FIGS. 20C and 20D are diagrams each showing a modification in which multiple through holes whose number is not four or more form an aperture pattern and correspond to two pyroelectric elements.

FIGS. 20E and 20F are diagrams each showing a modification in which multiple through holes forming an aperture pattern are not point-symmetric with respect to the center of a pyroelectric sensor.

FIG. 20G is a diagram showing a modification in which a single through hole forms an aperture pattern.

EMBODIMENTS

Figure 1:
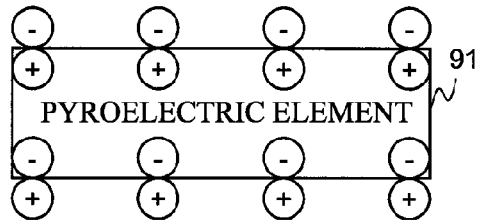
FIG. 1 is a diagram showing the state of a pyroelectric element at a given temperature T [° C.].
Figure 2:
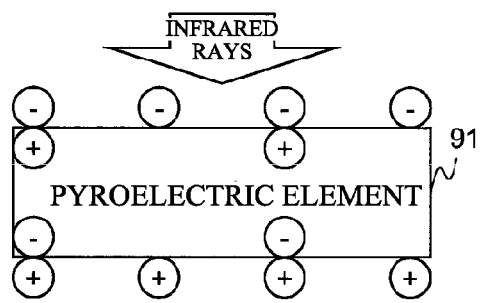
FIG. 2 is a diagram showing the state in which the magnitude of polarization in the pyroelectric element has changed with a temperature change.
Figure 3:
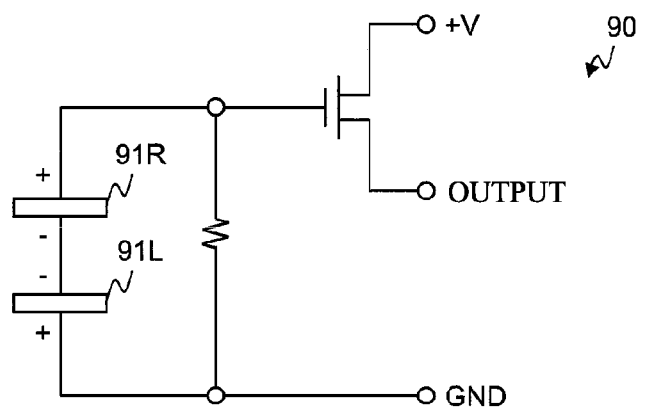
FIG. 3 is a circuit diagram of a dual pyroelectric sensor.
Figure 4:
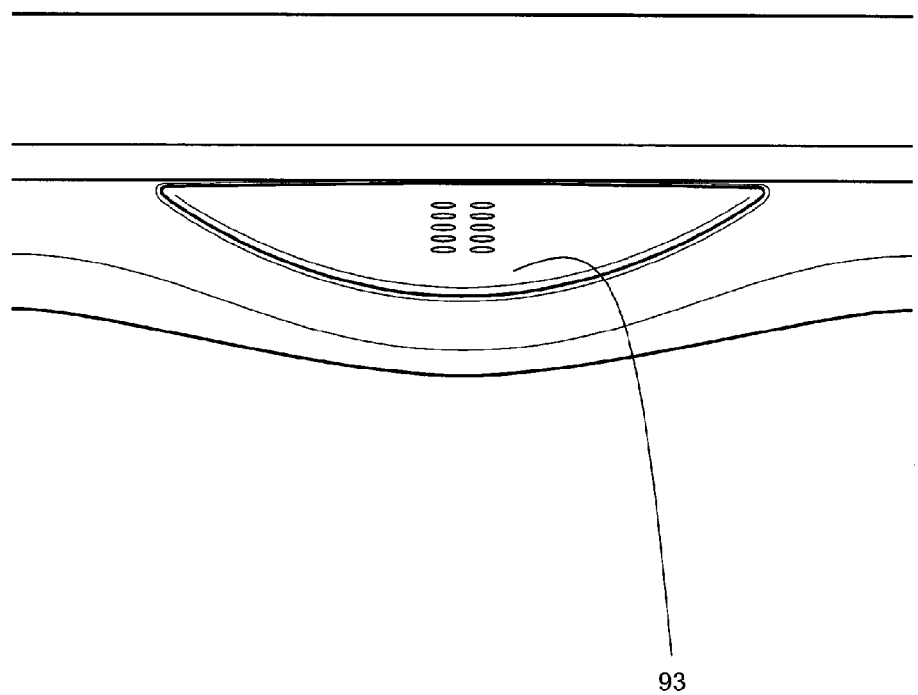
FIG. 4 is an external view of a mask attached to a lower portion of a liquid crystal display.
Figure 5:
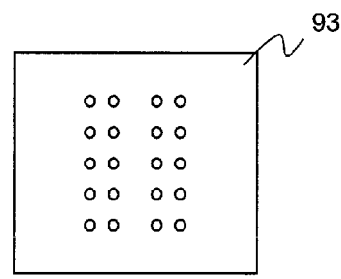
FIG. 5 is a schematic diagram of the aperture pattern of the mask.
Figure 6:
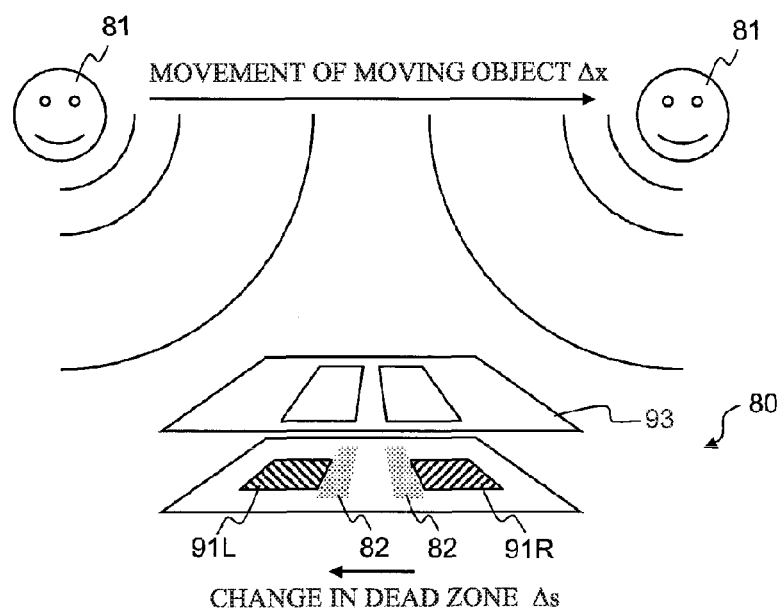
FIG. 6 is a diagram showing a change in a dead zone when a moving object crosses the pyroelectric sensor.

Now, an embodiment of the present invention will be described with reference to the drawings. Throughout the drawings, elements having the same functions are given the same reference signs and will not be described repeatedly.

First Embodiment

A pyroelectric sensor including a mask 110 of a first embodiment will be described.

FIG. 8A is an external view of the mask 110, and FIG. 8B shows example sizes of the aperture pattern 112 of the mask 110.

The mask 110 includes a sheet 111 configured to block infrared rays, the aperture pattern 112 including multiple through holes formed in the sheet 111, and an attachment part 113.

The mask 110 is shaped, for example, by punching a metal plate (punching metal).

In the following description, the disposition direction of two pyroelectric elements on the sensing surface of the pyroelectric sensor is defined as an x-direction, and a direction perpendicular to the x-direction on the sensing surface is defined as a y-direction. The aperture pattern 112 is formed with an enough inclination, unlike conventional aperture patterns, so that the percentages of the irradiated ranges of pyroelectric elements 91R and 91L vary with a movement of a moving object in each of the x- and y-directions.

If the aperture pattern is symmetric with respect to x- and y-direction axes passing through the center of the pyroelectric sensor, the percentages of the irradiated ranges of the pyroelectric elements 91R and 91L may not vary with a movement of the moving object in the x- or y-direction. The phrase "the center of the pyroelectric sensor" refers to a point with respect to which the pyroelectric elements 91R and 91L disposed on the sensing surface are point-symmetric with each other. The phrase "the aperture pattern is symmetric with respect to x- and y-direction axes passing through the center of the pyroelectric sensor" means that the aperture pattern is line-symmetric with respect to x'- and y'-axes obtained by sliding the x- and y-direction axes passing through the center of the pyroelectric sensor to the aperture pattern-formed surface in a z-direction, which is perpendicular to the x- and y-directions. In the case of the aperture pattern of the mask 93, for example, the percentages of the irradiated ranges of the pyroelectric elements 91R and 91L does not vary with a movement of a moving object in the y-direction. For this reason, the aperture pattern 112 is formed in such a manner to be asymmetric with respect to the x- and y-direction axes passing through the center of the pyroelectric sensor. The aperture pattern is also formed in such a manner that the area ratio between two portions obtained by dividing the aperture pattern using the x-direction axis (x'-axis) and the area ratio between two portions obtained by dividing the aperture pattern using the y-direction axis (y'-axis) are both 1:1.

The aperture pattern is, for example, point-symmetric with respect to the center of the pyroelectric sensor. The phrase "point-symmetric with respect to the center of the pyroelectric sensor" refers to being "point-symmetric with respect to a point o' obtained by sliding the center of the pyroelectric sensor to the aperture pattern-formed surface in the z-direction."

In the present embodiment, the aperture pattern 112 includes eight through holes 112-1 to 112-8.

Three through holes, 112-1 to 112-3, form a first through hole line extending in the y-direction, and three through holes, 112-5 to 112-7, form a second through hole line extending in the y-direction. The through hole 112-4 is disposed on the side remote from the second through hole line, of the first through hole line. The through hole 112-8 is disposed on the side remote from the first through hole line, of the second through hole line. Two through holes, 112-2 and 112-7, form a line extending in the x-direction, and two through holes, 112-3 and 112-6, form a line extending in the x-direction. Three through holes, 112-4, 112-1, and 112-2, are disposed at the vertices of a regular triangle. Three through holes, 112-8, 112-5, and 112-6, are disposed at the vertices of a regular triangle.

In other words, the three through holes, 112-1 to 112-3, are arranged in this order at equal intervals and form the first through hole line extending in the y-direction. The three through holes, 112-5 to 112-7, are formed in such a manner to be point-symmetric with the three through holes, 112-1 to 112-3, respectively, with respect to the center of the pyroelectric sensor, and form the second through hole line. The through holes 112-2 and 112-7 are adjacent to each other in the x-direction, and the through holes 112-3 and 112-6 are adjacent to each other in the x-direction. The through hole 112-4 is formed in such a manner to be outside the first through hole line when seen from the center of the pyroelectric sensor. The three through holes, 112-4, 112-1, and 112-2, are disposed at the vertices of a regular triangle. The through hole 112-8 is formed in such a manner to be point-symmetric with the through hole 112-4 with respect to the center of the pyroelectric sensor.

The distance between the first and second through hole lines in the x-direction is, e.g., 0.5 mm; the diameter of each through hole is, e.g., 0.5 mm; and the distance between the centers of the through holes forming the vertices of each regular triangle is, e.g., 0.9 mm. The distances or diameter may be set based on the distance between the sheet 111 and pyroelectric elements (e.g., 1.1 mm), the positions or sizes of the pyroelectric elements, or the like, as appropriate. The pyroelectric elements are formed of, for example, a lead zirconate titanate (PZT)-based pyroelectric ceramic. A PZT-based pyroelectric ceramic is a solid solution of lead titanate ($PvTiO_3$) and lead zirconate ($PbZrO_3$).

FIG. 9 is a schematic diagram of the aperture pattern 112. FIGS. 10A to 10C show the position of a dead zone 102 generated by the aperture pattern 112. Specifically, FIG. 10A shows the positional relationship between the dead zone 102 and the pyroelectric elements 91R and 91L when a moving object is located in front of the pyroelectric sensor; FIG. 10B shows the positional relationship between the dead zone 102 and the pyroelectric elements 91R and 91L when the moving object moves in the x-direction (left direction) with respect to the pyroelectric sensor; and FIG. 10C shows the positional relationship between the dead zone 102 and the pyroelectric elements 91R and 91L when the moving object moves in the y-direction (upward direction) with respect to the pyroelectric sensor. Note that the irradiated portions are shown not as circular portions but as regions including the irradiated portions for simplification.

As shown in FIG. 11, by forming the aperture pattern 112 of the mask 110 as described above, the percentages of the irradiated ranges of the pyroelectric elements 91R and 91L vary with a movement of the moving object in each of the x- and y-directions. In FIG. 10B, the irradiated range of the pyroelectric element 91R increases by 22.5%, while the irradiated range of the pyroelectric element 91L decreases by 30%. Accordingly, a difference of 52.5% occurs therebetween. In FIG. 10C, the irradiated range of the pyroelectric element 91R increases by 30%, while the irradiated range of the pyroelectric element 91L decreases by 30%. Accordingly, a difference of 60% occurs therebetween. That is, it is possible to realize y-direction detection, which has been impossible in the conventional art, while achieving a level of x-direction detection sensitivity which is almost the same as that of the conventional art.

Note that the values in FIG. 11 are values when the shape of the dead zone is changed to an ideal shape and the moving object moves at an ideal distance as seen in FIG. 10 or FIGS. 13, 15, 17, and 19 (to be discussed later) and are example values to conceptually describe the relationship between the aperture pattern and dead zone. Accordingly, the values do not necessarily correspond to the actual percentages of the irradiated ranges. For this reason, even when the sizes shown in FIG. 8B are employed, the values in FIG. 11 are not necessarily obtained. Further, in designing an actual mask, an aperture pattern as shown in FIG. 9 or FIG. 12, 14, 16, or 18 (to be discussed later) is designed so as to conform to the required specification, assuming that the shape of the dead zone is changed ideally and a moving object moves ideally. For example, if the x-direction sensitivity and y-direction sensitivity are required to be in balance, an aperture pattern as shown in FIG. 9 is designed.

<Effects>

Use of the mask configured as described above allows a dual pyroelectric sensor to accurately detect a movement of a moving object in each of the x- and y-directions.

<Modifications>

The present invention is not limited to the above embodiment. For example, the aperture pattern is not limited to the aperture pattern 112 described above. Any aperture pattern may be employed as long as the aperture pattern is formed with an inclination, unlike conventional aperture patterns, so that the percentages of the irradiated ranges of the pyroelectric elements 91R and 91L vary with a movement of a moving object in each of the x- and y-directions and thus the pyroelectric sensor can detect a movement of a moving object in each of the x- and y-directions. In other words, the aperture pattern is only required not to be symmetric with respect to the x- and y-direction axes passing through the center of the pyroelectric sensor and may be, for example, point-symmetric with respect to the center of the pyroelectric sensor.

FIGS. 12, 14, 16, and 18 are schematic diagrams of aperture patterns 112A, 112B, 112C, and 112D, respectively, of the mask 110.

FIGS. 13A to 13C, 15A to 15C, 17A to 17C, and 19A to 19C show the positions of dead zones 102A, 102B, 102C, and 102D, respectively, with respect to the position of a moving object. The dead zones 102A, 102B, 102, and 102D are generated by the aperture patterns 112A, 112B, 112C, and 112D, respectively. Specifically, FIGS. 13A, 15A, 17A, and 19A show the positional relationships between the dead zones 102A, 102B, 102C, and 102D, respectively, and the pyroelectric elements 91R and 91L when the moving object is located in front of the pyroelectric sensor; FIGS. 13B, 15B, 17B, and 19B show the positional relationships between the dead zones 102A, 102B, 102C, and 102D, respectively, and the pyroelectric elements 91R and 91L when the moving object moves in the x-direction (left direction) with respect to the pyroelectric sensor; and FIGS. 13C, 15C, 17C, and 19C show the positional relationships between the dead zones 102A, 102B, 102C, and 102D, respectively, and the pyroelectric elements 91R and 91L when the moving object moves in the y-direction (upward direction) with respect to the pyroelectric sensor.

As is understood in FIGS. 11, 13A to 13C, 15A to 15C, 17A to 17C, and 19A to 19C, use of any of the aperture patterns 112A, 112B, 112C, and 112D allows the pyroelectric sensor to detect a movement of the moving object in each of the x- and y-directions. In particular, if the user wants to increase the y-direction detection sensitivity, the aperture pattern 112C is useful. If the user wants to detect a movement of a moving object in the x-direction with a sensitivity level similar to that of the conventional art, it is preferred to use the aperture pattern 112D. When the detection sensitivity levels in both directions of each aperture pattern are summed up, it is understood that the aperture pattern 112 is the best.

The shape of the multiple through holes forming the aperture pattern need not necessarily be circular and may be changed as appropriate. For example, modifications are shown in FIGS. 20A and 20B.

The number of the multiple through holes forming the aperture pattern need not necessarily be four or more and may be changed as appropriate as long as multiple through holes correspond to the two pyroelectric elements. For example, modifications are shown in FIGS. 20C and 20D.

The multiple through holes forming the aperture pattern need not necessarily be point-symmetric with the center of the pyroelectric sensor and may be disposed otherwise. For example, modifications are shown in FIGS. 20E and 20F.

The aperture pattern need not necessarily be formed by multiple through holes and may be formed by a single through hole. That is, the number of through holes may be changed as appropriate. For example, a modification is shown in FIG. 20G. In short, the aperture pattern only has to be formed in such a manner that the percentages of the infrared-irradiated ranges of the two pyroelectric elements vary with a movement of the moving object in each of the x- and y-directions.

The through holes forming the aperture pattern only have to penetrate through the sheet 111 and to have infrared rays passed therethrough. Accordingly, the through holes need not necessarily connect the inside (the side on which the two pyroelectric elements are disposed) and outside of the mask 110. For example, the through holes may be blocked by affixing a film or the like transmitting infrared rays to the sheet.

While the mask 110 is shaped by punching a metal plate in the above embodiment, a sheet for blocking infrared rays may be printed on a film or the like transmitting infrared rays so that an aperture pattern including through holes is formed.

Further, changes can be made to the embodiment as appropriate without departing from the spirit and scope of the present invention.

DESCRIPTION OF NUMERALS 110 mask
111 sheet
112, 112A, 112B, 112C, 112D aperture pattern
112-1 to 112-8 through hole
113 attachment part

The invention claimed is:

1. A mask applied to a sensing surface of a dual element pyroelectric sensor to increase sensitivity with which the pyroelectric sensor detects a moving object, the mask comprising:
 a sheet configured to block infrared rays; and
 an aperture pattern comprising through holes formed in the sheet,
 wherein the aperture pattern is formed in such a manner that percentages of respective infrared-irradiated ranges of first and second pyroelectric elements of the pyroelectric sensor vary with a movement of a moving object in each of x- and y- directions, the x-direction being a disposition direction of the two pyroelectric elements on the sensing surface, the y-direction being a direction perpendicular to the x-direction on the sensing surface,
 wherein the sheet comprises a first portion parallel with a y-direction axis passing through the center of the pyroelectric sensor and a second portion disposed on the periphery of the mask,
 wherein the aperture pattern comprises a first aperture region and a second aperture region surrounded by the first and second portions and disposed on both sides of the y-direction axis,
 wherein the first aperture region is masked over only a part of the first pyroelectric element in a plan view, and the second aperture region is masked over only a part of the second pyroelectric element in the plan view,
 wherein the first and second pyroelectric elements are each unitary elements, and
 wherein an edge in the y-direction, of the first aperture region protrudes further in the y-direction than an edge in the y-direction, of the second aperture region.

2. The mask of claim 1, wherein the aperture pattern is asymmetric with respect to an x-direction axis passing through the center of the pyroelectric sensor, and
 wherein an area ratio between two portions obtained by dividing the aperture pattern using the x-direction axis is 1:1.

3. The mask of claim 1, wherein the aperture pattern is asymmetric with respect to a y-direction axis passing through the center of the pyroelectric sensor, and
 wherein an area ratio between two portions obtained by dividing the aperture pattern using the y-direction axis is 1:1.

4. The mask of claim 1, wherein the aperture pattern is point-symmetric with respect to the center of the pyroelectric sensor.

5. The mask of claim 4, wherein the aperture pattern comprises:
 a first to third through holes forming a first through hole line extending in the y-direction;
 a fifth to seventh through holes forming a second through hole line extending in the y-direction;
 a fourth through hole disposed on a side of the first through hole line remote from the second through hole line; and
 an eighth through hole disposed on a side of the second through hole line remote from the first through hole line,
 wherein the second and seventh through holes form a line extending in the x-direction,
 wherein the third and sixth through holes form a line extending in the x-direction,
 wherein the fourth, first, and second through holes are disposed at vertices of a triangle, and
 wherein the eighth, fifth, and sixth through holes are disposed at vertices of a triangle.

6. The mask of claim 1, wherein a y-direction length adjacent to the y-direction axis, of each of the two aperture regions is greater than or equal to a y-direction length of each of the two pyroelectric elements.

* * * * *